2,838,508

CHEMICAL PROCESS AND PRODUCT

Hugh E. Ramsden, Scotch Plains, N. J., assignor to Metal & Thermit Corporation, Rahway, N. J., a corporation of New Jersey No Drawing. Application September 18, 1956
Serial No. 610,649

7 Claims. (Cl. 260—247)

The present invention relates to a process for separating Grignard reagents from saturated or ethylenically unsaturated cyclic ethers with which they are mixed or complexed and to a process for synthesizing organic and organo-metallic compounds from Grignard reagents which have been so separated. More particularly, the present invention relates to a process for separating Grignard reagents from saturated or ethylenically unsaturated cyclic ethers of the general formula:

wherein X is a divalent radical such as methylene and =NR″ in which R″ is a hydrocarbon radical, preferably alkyl, R is a straight chain saturated divalent aliphatic hydrocarbon radical and R′ is saturated or ethylenic unsaturated divalent aliphatic hydrocarbon radical or a hydrocarbonoxy (e. g., alkoxy, aryloxy) substituted saturated or ethylenically unsaturated divalent hydrocarbon aliphatic radical. Complexes and mixtures containing 5 and 6 member cyclic ethers of the above type and, more particularly tetrahydrofuran, are of special utility in connection with the process of the present invention in view of the fact that Grignard reagents are readily prepared from the organochlorides in the presence of these 5 and 6 member cyclic ethers. By way of illustration, complexes or mixtures containing the following cyclic ethers may be used in this process: tetrahydrofuran, tetrahydropyran, 2-methyltetrahydrofuran, 2-ethoxytetrahydropyran, tetrahydrofurfuryl ethyl ether, dihydropyran, and N-methylmorpholine.

In the following discussion, reference is made to tetrahydrofuran. However, it is to be understood that the remarks are equally applicable to other cyclic ethers defined in this specification.

The present process is applicable, generally, to mixtures or complexes of Grignard reagents with the cyclic ethers defined herein. However, it is of particular utility with respect to the organomagnesium chloride Grignard reagents. The organic chlorides are the least reactive of the halides toward magnesium in the preparation of Grignard reagents. Many of the Grignard reagents could not be prepared from the corresponding organic chlorides by the usual Grignard reaction. Among these may be mentioned the vinylic, heterocyclic and the substituted aryl chlorides. Other organic chlorides react only difficultly with magnesium in the preparation of the Grignard reagent by conventional means and the yields obtained are poor. These chlorides include methyl, allyl, benzyl chlorides, etc. It has been found that the Grignard reagents could be readily prepared from the organic chlorides by their reaction with magnesium in the presence of the cyclic ethers defined herein, and particularly in the presence of tetrahydrofuran. The present process, therefore, has special utility in separating the organomagnesium chlorides from these cyclic ethers combined in a mixture or a complex.

The organomagnesium chlorides which may be separated from mixtures or complexes containing the cyclic ethers may be represented by the formula:

$$R^2(MgCl)_x$$

wherein $x$ is a positive integer and $R^2$ is a substituted or unsubstituted radical selected from the class consisting of alkyl, alkenyl, aryl, aralkyl, aralkenyl and heterocyclic radicals. Where $x$ is greater than one in the above formula, $R^2$ is the corresponding polyvalent radical where valence is equal to $x$. The permissible substituents of $R^2$ are those groups which do not react with the reactants of, or the reaction products produced in the separation procedure.

It has further been found that organomagnesium chlorides prepared in tetrahydrofuran may be utilized in the synthesis of a great many organic and organometallic compounds. When such a synthesis is carried out, the reaction mixture contains the desired organic or organometallic compound, magnesium chlorides, tetrahydrofuran and often other solvents which have been utilized in the process. When the organic or organometallic compounds produced have boiling points that the the same or close to that of tetrahydrofuran, a difficult separation problem is presented. The same problem is presented when an excess of one or more solvents or reagents, that must be recycled to the system if the process is to be economical, have boiling points close to that of tetrahydrofuran. The solution to this problem is to displace the tetrahydrofuran from the organomagnesium chloride after the synthesis of the organomagnesium chloride and before its introduction into the reaction mixture to prepare the desired organic or organometallic compound.

It has been found that tetrahydrofuran is very tightly bonded to the organomagnesium chlorides and in fact forms a complex with them. It has not been possible to separate them thermally or mechanically. Various solvents have been added in an attempt to break this organomagnesium chloride-tetrahydrofuran complex, with only partial success. When a mixture of an organomagnesium chloride-tetrahydrofuran complex was refluxed with excess xylene or cumene, tetrahydrofuran could be driven off only to a lower limit of about 1–1.5 moles of tetrahydrofuran per mole of organomagnesium chloride present. Until the present invention attempts to drive off substantially all of the tetrahydrofuran have been unsuccessful.

I have now discovered that substantially all the tetrahydrofuran or other specified cyclic ethers may be separated from organomagnesium chloride-tetrahydrofuran mixtures or complexes, without destroying the organomagnesium chloride.

It is an object of the present invention to provide an improved process for synthesizing organic and organometallic compounds from Grignard reagents.

Another object of the invention is to provide a process for separating tetrahydrofuran and other specified cyclic ethers from organomagnesium chlorides.

Other objects and advantages will become apparent from the following description and claims.

Generally speaking, the present invention contemplates the addition to mixtures of an organomagnesium chloride in tetrahydrofuran or other specified cyclic ethers of an ethylene polyether selected from the class consisting of the diethers of ethylene glycol and polyethylene glycol (herein called ethylene polyethers), and having the general formula: $R^3O(CH_2CH_2O)_xR^4$, and then separating the tetrahydrofuran by such conventional means as distillation, decanting, etc. In the general formula $R^3$ and $R^4$ may be the same or different and are selected from the class consisting of aliphatic hydrocarbon radicals having 2 to 5 carbon atoms in the chain; phenyl groups and substituted phenyl groups having not more than 5 atoms in each substituting group (and not more than 3 substituting groups), and from aralkyl groups in which the aryl portion of the group is phenyl and having no more than 3 or 4 carbon atoms in the alkyl portion of the group; the permissible substituting groups being those that do not react with components of the reaction mixture, with the cyclic ethers, and/or with the reaction products under the conditions utilized, and $x$ equals a whole number from 1 to 8. The preferred ethylene polyethers are diethylene glycol diethyl ether, ethylene glycol dimethyl ether, diethylene glycol dimethyl ether, triethylene glycol dimethyl ether and tetraethylene glycol dimethyl ether.

As noted hereinbefore, it has been found that many Grignard reagents which could not be prepared before my inventions, can be prepared in tetrahydrofuran. Although the mechanism of Grignard formation is not well understood, it is believed that this must be affected by the great attraction of affinity of tetrahydrofuran for organomagnesium chlorides. Because of this attraction and/or affinity, it has not been possible to separate the tetrahydrofuran from the Grignard. It has now been found that tetrahydrofuran is displaced from Grignard reagents by the ethylene polyethers of this invention. This is accomplished by simply adding, preferably slowly and with agitation, the ethylene polyether to the organomagnesium chloride-tetrahydrofuran mixture, and then recovering the tetrahydrofuran by a separatory technique. It has been found that when such an addition is made to an organomagnesium chloride tetrahydrofuran mixture which has reached equilibrium at room temperature, there is a definite rise in temperature during the addition. However, according to this invention, the ethylene polyether may be added to an organomagnesium chloride tetrahydrofuran mixture while the latter is at a temperature above room temperature.

Although the process has generally been described in terms of mixtures of the organomagnesium chloride in tetrahydrofuran, it is equally applicable to the other cyclic ethers specified hereinbefore. The reflux temperature of the various mixtures are, of course, dependent upon the cyclic ether utilized. All of these ethers may be displaced by the ethylene polyethers of the present process.

The following examples are illustrative of the present invention, however, it will be understood that the invention is not limited thereto.

Example 1

Vinyl magnesium chloride was prepared by adding a small amount of vinyl chloride dissolved in tetrahydrofuran (ratio of 1:3) to 1 mole of magnesium and initiating the reaction with one-half milliliter of ethyl bromide. The remainder of a solution of 1 mole of vinyl chloride in 3 moles of tetrahydrofuran was slowly added until the reaction was completed. The reaction mixture was allowed to cool and at a temperature of about 35° C., diethylene glycol diethyl ether was slowly added to the mixture. The temperature of the mixture rose to between 38° C. and 39° C. during the addition of a total of 2 moles of diethylene glycol diethyl ether. The reaction mixture was then distilled at reduced pressures and the tetrahydrofuran removed, leaving the vinylmagnesium chloride in the diethylene glycol diethyl ether. To the 3 mole mixture of vinylmagnesium chloride in diethylene glycol diethyl ether was then slowly added 1 mole of trimethylchlorosilane. The reaction was carried out under a nitrogen atmosphere with constant agitation. During the addition of the trimethyl chlorosilane an additional 100 milliliters diethylene glycol diethyl ether was added to reduce the viscosity of the reaction mixture. After the completion of the addition, the reaction mixture was cooled and hydrolyzed with dilute hydrochloric acid to form an organic layer and an aqueous layer. The organic layer was distilled and trimethyl vinyl silane recovered therefrom; the yield was 78%.

Example 2

Methylmagnesium chloride was prepared by reacting 1 mole of methyl chloride with 1 mole of magnesium in the presence of 3 moles of tetrahydrofuran. The addition was carried out with agitation and under a nitrogen atmosphere. After the completion of the addition, agitation was continued for an hour and a half and the apparatus was then allowed to cool. The next morning, when the reaction mixture was at 24° C., 2 moles of diethylene glycol diethyl ether were added to the reaction mixture over a 25 minute period. The temperatures rose to 31° C. within 15 minutes and remained between 31–32° C. through the remainder of the addition. Then 25 milliliters of Primol-D (high boiling petroleum mineral oil) was added to the reaction mixture and the mixture distilled at reduced pressure. Eighty-six and one-half percent (86½%) of the original tetrahydrofuran charge was removed in the main distillation cut, and a few additional milliliters of tetrahydrofuran with some diethylene glycol diethylene ether were removed at a higher temperature with the Primol-D. The modified Gilman test established that there was a methylmagnesium chloride-diethylene glycol diethyl ether yield of 89%.

Example 3

Following the procedure of Example 2, tetrahydropyran, from a reaction mixture of 1 mole allylmagnesium chloride prepared in 3.5 moles of tetrahydropyran, is replaced with ethylene glycol dimethyl ether.

Example 4

Following the procedure of Example 2, 2-methyl-tetrahydrofuran, from a reaction mixture of benzylmagnesium chloride prepared in 2-methyltetrahydrofuran, is replaced with diethylene glycol dimethyl ether.

Example 5

Following the procedure in Example 2, 2-ethoxytetrahydropyran, from a reaction mixture of phenylmagnesium chloride prepared in 2-ethoxytetrahydropyran is replaced with triethylene glycol dimethyl ether.

Example 6

Following the procedure of Example 2, tetrahydrofurfuryl ethyl ether, from a reaction mixture of p-ethoxytolylmagnesium chloride (2-ethoxy-5-methyl phenyl magnesium chloride or 2-methyl-5-ethoxy phenyl magnesium chloride) prepared in tetrahydrofurfuryl ethyl ether, is replaced with tetraethylene glycol dimethyl ether.

Example 7

Following the procedure of Example 2, dihydropyran from a reaction mixture of ortho or para biphenylmagnesium chloride prepared in dihydropyran is replaced with diethylene glycol diethyl ether.

Example 8

Following the procedure of Example 2, N-methylmorpholine, from a reaction mixture of α-naphthylmagnesium chloride prepared in N-methylmorpholine, is replaced with diethylene glycol diethyl ether.

Example 9

Following the procedure of Example 1, tetrahydrofuran, from a reaction mixture of 3-chloronaphthylmagnesium chloride prepared in tetrahydrofuran is replaced with diethylene glycol diethyl ether.

Example 10

Following the procedure of Example 1, tetrahydrofuran, from a reaction mixture of 1 mole β-phenylvinyl magnesium chloride prepared in 2 moles of tetrahydrofuran is replaced with 1.1 mole of diethylene glycol ethylbutyl ether.

*Example 11*

Following the procedure of Example 1, tetrahydrofuran, from a reaction mixture of β-tolylvinylmagnesium chloride prepared in tetrahydrofuran, is replaced with triethylene glycol diphenyl ether.

*Example 12*

Following the procedure of Example 1, tetrahydrofuran, from a reaction mixture of 2-thienylmagnesium chloride prepared in tetrahydrofuran, is replaced with octaethylene glycol diethyl ether.

*Example 13*

Following the procedure of Example 1, tetrahydrofuran, from a reaction mixture of 2-pyridylmagnesium chloride prepared in tetrahydrofuran, is replaced with diethylene glycol di-t-butylphenyl ether.

*Example 14*

Following the procedure of Example 1, tetrahydrofuran, from a reaction mixture of 2-furylmagnesium chloride prepared in tetrahydrofuran, is replaced with triethylene glycol dixylyl ether.

*Example 15*

Following the procedure of Example 1, tetrahydrofuran, from a reaction mixture of 4-methyl-2-penten-2-yl-magnesium chloride prepared in tetrahydrofuran, is replaced with diethylene glycol diethyl ether.

*Example 16*

Following the procedure of Example 1, tetrahydrofuran, from a reaction mixture of p-vinylphenylmagnesium chloride prepared in tetrahydrofuran, is replaced with diethylene glycol diethyl ether.

Although organomagnesium chlorides have specific end uses as catalysts, their primary and greatest uses are as chemical intermediates in the well known Grignard synthesis. By the proper choice of ethylene polyether, it is possible to obtain an organomagnesium chloride in ethylene polyether which, when reacted with the desired reactant to yield desired products of the Grignard synthesis, will produce a mixture of reaction products and solvents which may be readily separated by conventional separatory techniques.

While the invention has been described with particular reference to specific embodiments, it is to be understood that it is not limited thereto but is to be construed broadly and restricted solely by the scope of the appended claims.

What is claimed is:

1. A process for releasing cyclic ethers from their complex with organomagnesium chloride type Grignards without destruction of the Grignard and without rendering the Grignard unavailable for subsequent reaction which comprises mixing a composition containing the complex with an ethylene polyether of the general formula:

$$RO(CH_2CH_2O)_xR'$$

wherein $x$ is a positive integer from 1 to 8, and R and R' are hydrocarbon groups.

2. The process in claim 1 wherein R and R' are selected from the class consisting of aliphatic hydrocarbon groups having 2 to 5 carbon atoms in the claim, and aryl groups.

3. The process according to claim 1 wherein the ethers contain from 5 to 6 atoms in the ring and wherein (a) there is only one oxygen atom in the ring, (b) the other ring atoms are carbon, (c) one ring carbon separated from the oxygen atom in the ring by two carbon atoms may be replaced by an alkyl substituted nitrogen atom, (d) the ring contains not more than one double bond, (e) at least one carbon atom adjacent the oxygen atom in said ring being free of any substituents other than hydrogen, (f) said ether contains no substituent which reacts with organomagnesium chlorides or with other components or products of the reaction mixture.

4. The process in claim 3 wherein R and R' are selected from the class consisting of aliphatic hydrocarbon groups having 2 to 5 carbon atoms in the chain, and aryl groups.

5. A process according to claim 1 wherein the organomagnesium chloride is selected from the class consisting of alkyl-magnesium chloride, alkenylmagnesium chloride, arylmagnesium chlorides and aromatic-heterocyclic magnesium chlorides.

6. The process according to claim 1 wherein the cyclic ether is selected from the class consisting of tetrahydrofuran, tetrahydropyran, dihydropyran, 2-ethoxy-tetrahydropyran, tetrahydrofurfuryl ethyl ether, 2-methyl-tetrahydrofuran, and N-methylmorpholine.

7. The process according to claim 1 wherein the cyclic ether is recovered by distillation.

References Cited in the file of this patent

Lewis et al.: J. Am. Chem. Soc., vol. 74, pp. 1253–7 (1952).

Petrov et al.: Chem. Abstracts, vol. 46, col. 11102 (1952).

Kumada: Chem. Abstracts, vol. 46, cols. 6082–3 (1952).

Kharasch et al.: Grignard Reactions of Nonmetallic Substances (Prentice Hall), M 1306–7.